US010712080B2

(12) United States Patent
Westlake et al.

(10) Patent No.: US 10,712,080 B2
(45) Date of Patent: Jul. 14, 2020

(54) VACUUM INSULATED REFRIGERATOR CABINET

(71) Applicant: WHIRLPOOL CORPORATION, Benton Harbor, MI (US)

(72) Inventors: Lorraine J. Westlake, Benton Harbor, MI (US); Eric J. Dherde, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/093,694

(22) PCT Filed: Apr. 15, 2016

(86) PCT No.: PCT/US2016/027736
§ 371 (c)(1),
(2) Date: Oct. 15, 2018

(87) PCT Pub. No.: WO2017/180147
PCT Pub. Date: Oct. 19, 2017

(65) Prior Publication Data
US 2019/0128592 A1 May 2, 2019

(51) Int. Cl.
*F25D 23/06* (2006.01)
*B29D 99/00* (2010.01)
(Continued)

(52) U.S. Cl.
CPC ......... *F25D 23/066* (2013.01); *B29D 99/001* (2013.01); *F25D 23/062* (2013.01);
(Continued)

(58) Field of Classification Search
CPC ... F25D 23/062; F25D 23/066; F25D 2201/14
See application file for complete search history.

(56) References Cited

U.S. PATENT DOCUMENTS

| 948,541 A | 2/1910 | Coleman |
| 1,252,816 A * | 1/1918 | Kuehl .................. A47B 87/02 |
| | | 312/107 |

(Continued)

FOREIGN PATENT DOCUMENTS

| CA | 626838 A | 5/1961 |
| CA | 1320631 | 7/1993 |

(Continued)

OTHER PUBLICATIONS

Cai et al., "Generation of Metal Nanoparticles by Laser Ablation of Microspheres," J. Aerosol Sci., vol. 29, No. 5/6 (1998), pp. 627-636.
(Continued)

*Primary Examiner* — Matthew W Ing
(74) *Attorney, Agent, or Firm* — Price Heneveld LLP

(57) ABSTRACT

A method of making a vacuum insulated refrigerator cabinet structure includes thermoforming a first polymer sheet to form a wrapper having a base wall and four sidewalls. The method also includes thermoforming a second polymer sheet to form a liner having a base wall and four sidewalls. Elongated corner stiffeners are adhesively secured to inside corners of the wrapper. A resilient ring is adhesively secured to the wrapper and liner. The resilient ring includes pins that are received in openings of the elongated corner stiffeners. Porous material is disposed in a vacuum cavity between the wrapper and the liner.

20 Claims, 6 Drawing Sheets

(51) Int. Cl.
  *B29L 31/00* (2006.01)
  *B29C 51/26* (2006.01)
  *B29K 25/00* (2006.01)
  *B29K 27/00* (2006.01)
  *B29K 55/02* (2006.01)

(52) U.S. Cl.
  CPC ........ *B29C 51/266* (2013.01); *B29K 2025/06* (2013.01); *B29K 2027/08* (2013.01); *B29K 2055/02* (2013.01); *B29K 2995/0067* (2013.01); *B29L 2031/7622* (2013.01); *F25D 2201/14* (2013.01)

(56) References Cited

U.S. PATENT DOCUMENTS

| | | |
|---|---|---|
| 1,275,511 A | 8/1918 | Welch |
| 1,845,353 A | 12/1928 | Snell |
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,644,605 A | 7/1953 | Palmer |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Louis et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,768,687 A | 10/1973 | Spencer |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,118,266 A | 10/1978 | Kerr |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 4,951,652 A | 8/1990 | Ferrraio et al. |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Cospey et al. |
| 5,509,248 A | 4/1996 | Dellby et al. |
| 5,512,345 A * | 4/1996 | Tsutsumi ............... F25D 23/063 220/592.27 |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,704,107 A | 1/1998 | Schmidt et al. |
| 5,716,581 A | 2/1998 | Tirrell |
| 5,768,837 A | 6/1998 | Sjoholm |
| 5,792,539 A | 8/1998 | Hunter |
| 5,792,801 A | 8/1998 | Tsuda et al. |
| 5,813,454 A | 9/1998 | Potter |

(56) References Cited

U.S. PATENT DOCUMENTS

| | | |
|---|---|---|
| 5,826,780 A | 10/1998 | Neeser et al. |
| 5,827,385 A | 10/1998 | Meyer et al. |
| 5,834,126 A | 11/1998 | Sheu |
| 5,843,353 A | 12/1998 | De Vos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,037,033 A | 3/2000 | Hunter |
| 6,038,830 A * | 3/2000 | Hirath .................. F16L 59/065 428/69 |
| 6,063,471 A | 5/2000 | Dietrich et al. |
| 6,094,922 A | 8/2000 | Ziegler |
| 6,102,219 A * | 8/2000 | Wang .................... A47B 87/00 211/194 |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A * | 12/2000 | Cohen .................. F16L 59/065 220/641 |
| 6,163,976 A | 12/2000 | Tada et al. |
| 6,164,030 A | 12/2000 | Dietrich |
| 6,164,739 A | 12/2000 | Schultz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,217,140 B1 | 4/2001 | Hirath et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,336,693 B2 | 1/2002 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,474,759 B2 * | 11/2002 | Hsu ..................... A47B 47/042 312/108 |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,855,766 B2 | 2/2005 | Oppenheimer-Stix et al. |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 7,008,032 B2 | 3/2006 | Chekal et al. |
| 7,014,283 B2 * | 3/2006 | Grace .................... F25D 23/062 312/406 |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,284,390 B2 | 10/2007 | Van Meter et al. |
| 7,296,423 B2 | 11/2007 | Müller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,449,227 B2 | 11/2008 | Echigoya et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,939,179 B2 | 5/2011 | DeVos et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,456,040 B2 | 6/2013 | Allard et al. |
| 8,486,215 B2 | 7/2013 | Amann |
| 8,491,070 B2 | 7/2013 | Davis et al. |
| 8,516,845 B2 | 8/2013 | Wuesthoff et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,739,568 B2 | 6/2014 | Allard et al. |
| 8,752,918 B2 | 6/2014 | Kang |
| 8,752,921 B2 | 6/2014 | Gorz et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |
| RE45,501 E | 5/2015 | Maguire |
| 9,056,952 B2 | 6/2015 | Eilbracht et al. |
| 9,062,480 B2 | 6/2015 | Litch |
| 9,074,811 B2 | 7/2015 | Korkmaz |
| 9,080,808 B2 | 7/2015 | Choi et al. |

(56) References Cited

U.S. PATENT DOCUMENTS

| | | |
|---|---|---|
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 9,927,169 B2 | 3/2018 | Baker et al. |
| 9,976,753 B2 | 5/2018 | Hynes |
| 10,024,544 B2 | 7/2018 | Bhogal et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano et al. |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espendola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1* | 1/2007 | Park .................. B29C 44/1238 312/406 |
| 2007/0099502 A1 | 5/2007 | Ferinauer et al. |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Nuemann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1* | 5/2012 | Jung .................. F25D 23/085 312/406 |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0202049 A1 | 8/2012 | Valladeau et al. |
| 2012/0231204 A1 | 9/2012 | Jeon et al. |
| 2012/0237715 A1 | 9/2012 | McCraken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0256319 A1 | 3/2013 | Kuehl et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0257256 A1 | 10/2013 | Allard et al. |
| 2013/0257257 A1* | 10/2013 | Cur .................. F25D 23/065 312/406.1 |
| 2013/0264439 A1 | 10/2013 | Allard et al. |
| 2013/0270732 A1* | 10/2013 | Wu .................. B29C 51/02 264/101 |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0047775 A1 | 2/2014 | Litch |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |

(56) References Cited

U.S. PATENT DOCUMENTS

| | | |
|---|---|---|
| 2014/0260332 A1 | 9/2014 | Wu |
| 2014/0346942 A1 | 11/2014 | Kim et al. |
| 2014/0364527 A1 | 12/2014 | Wintermantel et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0047624 A1 | 2/2015 | Luckhardt et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1* | 9/2016 | Allard .................. F25D 23/065 |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0159942 A1 | 6/2017 | Ivanovic et al. |
| 2017/0167781 A1* | 6/2017 | Mukherjee ............ F25D 23/066 |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 9/1997 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 12/2011 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 204963379 U | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 19948361 | 4/2001 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0480451 | 4/1992 |
| EP | 0645576 A1 | 3/1995 |
| EP | 0691518 | 1/1996 |
| EP | 0260699 | 3/1998 |
| EP | 0860669 | 8/1998 |
| EP | 1087186 | 3/2001 |
| EP | 1200785 | 5/2002 |
| EP | 1243880 | 9/2002 |
| EP | 1335171 A1 | 8/2003 |
| EP | 1484563 | 12/2004 |
| EP | 1496322 | 1/2005 |
| EP | 1505359 | 2/2005 |
| EP | 1602425 A1 | 12/2005 |
| EP | 1624263 A2 | 8/2006 |
| EP | 1344008 | 9/2006 |
| EP | 1338854 B1 | 12/2009 |
| EP | 2342511 | 7/2011 |
| EP | 2543942 A2 | 1/2013 |
| EP | 2607073 | 6/2013 |
| EP | 2789951 | 10/2014 |
| EP | 2801774 | 11/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 12/1970 |
| JP | S4828353 | 8/1973 |
| JP | S5157777 | 5/1976 |
| JP | S59191588 | 12/1984 |
| JP | 403013779 | 1/1991 |
| JP | 404165197 | 6/1992 |
| JP | 04165197 | 10/1992 |
| JP | 04309778 A | 11/1992 |
| JP | H06159922 | 6/1994 |
| JP | H071479 | 1/1995 |
| JP | H07167377 | 7/1995 |
| JP | 8145547 | 6/1996 |
| JP | H08300052 | 11/1996 |
| JP | H08303686 | 11/1996 |
| JP | H09166271 | 6/1997 |
| JP | H10113983 | 5/1998 |
| JP | 11159693 A | 6/1999 |
| JP | H11311395 | 11/1999 |
| JP | H11336990 | 12/1999 |
| JP | 2000097390 | 4/2000 |
| JP | 20000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 3478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006-77792 | 3/2006 |
| JP | 2006161834 A | 6/2006 |
| JP | 2006161945 | 6/2006 |
| JP | 3792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 4545126 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 4779684 | 9/2011 |

(56) References Cited

FOREIGN PATENT DOCUMENTS

| | | |
|---|---|---|
| JP | 2011196644 | 10/2011 |
| JP | 2012026493 | 2/2012 |
| JP | 4897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| JP | 2014126224 | 7/2014 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 20080103845 | 11/2008 |
| KR | 20090026045 | 3/2009 |
| KR | 1017776 | 2/2011 |
| KR | 101017776 | 2/2011 |
| KR | 20120007241 | 1/2012 |
| KR | 20120046621 | 5/2012 |
| KR | 20120051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 1996032605 | 10/1996 |
| WO | 9721767 | 6/1997 |
| WO | 098049506 | 11/1998 |
| WO | 1999/020964 A1 | 4/1999 |
| WO | 9920961 A1 | 4/1999 |
| WO | 9920964 | 4/1999 |
| WO | 200160598 | 8/2001 |
| WO | 200202987 | 1/2002 |
| WO | 2002052208 | 4/2002 |
| WO | 2002/052208 A1 | 7/2002 |
| WO | 02060576 A1 | 8/2002 |
| WO | 03072684 A1 | 9/2003 |
| WO | 2003089729 | 10/2003 |
| WO | 2004010042 A1 | 1/2004 |
| WO | 2006045694 | 5/2006 |
| WO | 2006073540 A2 | 7/2006 |
| WO | 2006/120198 A2 | 11/2006 |
| WO | 2006120183 | 11/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 | 3/2012 |
| WO | 2012043990 | 4/2012 |
| WO | 2012044001 | 4/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods for Producing Hollow Glass Microspheres," Powerpoint, cached from Google, Jul. 2009, 6 pages.

\* cited by examiner

VACUUM INSULATED REFRIGERATOR CABINET

BACKGROUND OF THE INVENTION

Various types of insulated refrigerator cabinet structures have been developed. A known type of refrigerator cabinet includes a metal wrapper and a polymer liner. Polyurethane foam is injected between the wrapper and the liner to provide insulation and support the wrapper and liner. Various types of vacuum insulated refrigerator cabinet structures have also been developed. However, known refrigerator cabinets may suffer from various drawbacks.

SUMMARY OF THE INVENTION

One aspect of the present invention is a method of making a vacuum insulated refrigerator cabinet structure. The method includes thermoforming a first polymer sheet to form a wrapper having a base wall and four sidewalls, wherein each sidewall includes inner and outer sides. The four sidewalls extend transversely from the base wall to form four elongated inside corners and a main opening. The method also includes thermoforming a second polymer sheet to form a liner having a base wall and four sidewalls, wherein each sidewall includes inner and outer sides. The sidewalls extend transversely from the base wall. Each sidewall of the liner includes a free edge opposite the base wall forming a main opening. The method further includes adhesively securing an elongated corner stiffener to each elongated inside corner of the wrapper. Each elongated corner stiffener includes an opening. A resilient ring is secured to the liner adjacent to the free edges of the sidewalls. The resilient ring includes four corners, and each corner includes a pin projecting from the corner. The method further includes positioning the liner inside the wrapper to form a cavity between the wrapper and the liner. The pins of the resilient ring are received in the openings of the elongated corner stiffeners. The resilient ring extends between the inner sides of the wrapper sidewalls and the outer sidewalls of the liner to seal the cavity. The resilient ring is adhesively sealed to the wrapper and to the liner. Porous material is disposed in the cavity between the wrapper and the liner. A vacuum is formed in the cavity, and the cavity is sealed to maintain the vacuum.

These and other features, advantages, and objects of the present device will be further understood and appreciated by those skilled in the art upon studying the following specification, claims, and appended drawings.

DETAILED DESCRIPTION OF EMBODIMENTS

Figure 1:
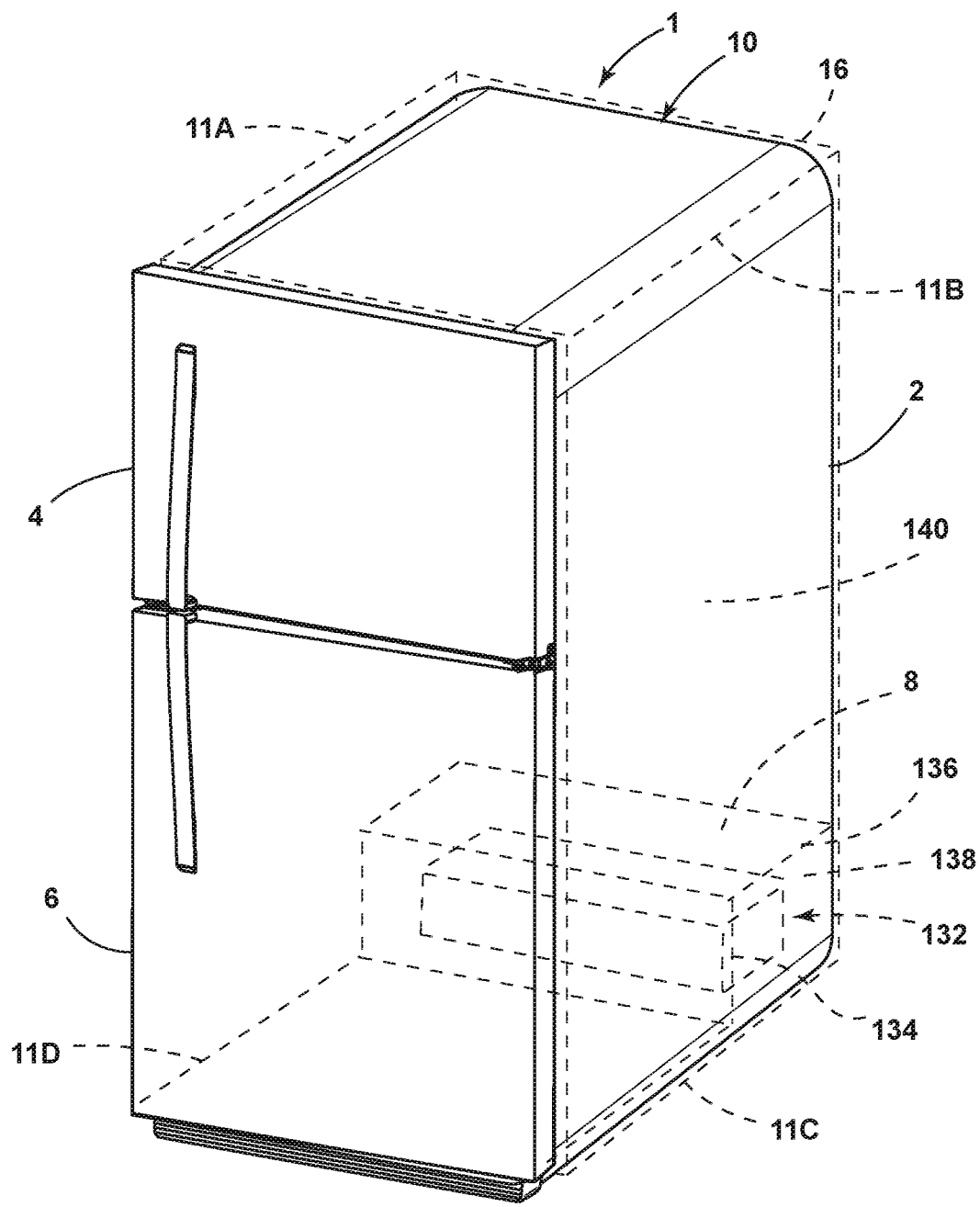
FIG. 1 is an isometric view of a refrigerator.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes a cabinet 2 and doors 4 and 6 that are movably mounted to the cabinet 2 for rotation about a vertical axis in a manner that is generally known in the art. Refrigerator 1 may include a refrigeration system 8 of a known type including a compressor, condenser, expansion valve, evaporator, tubing, and/or other related components (not shown).

Figure 2:
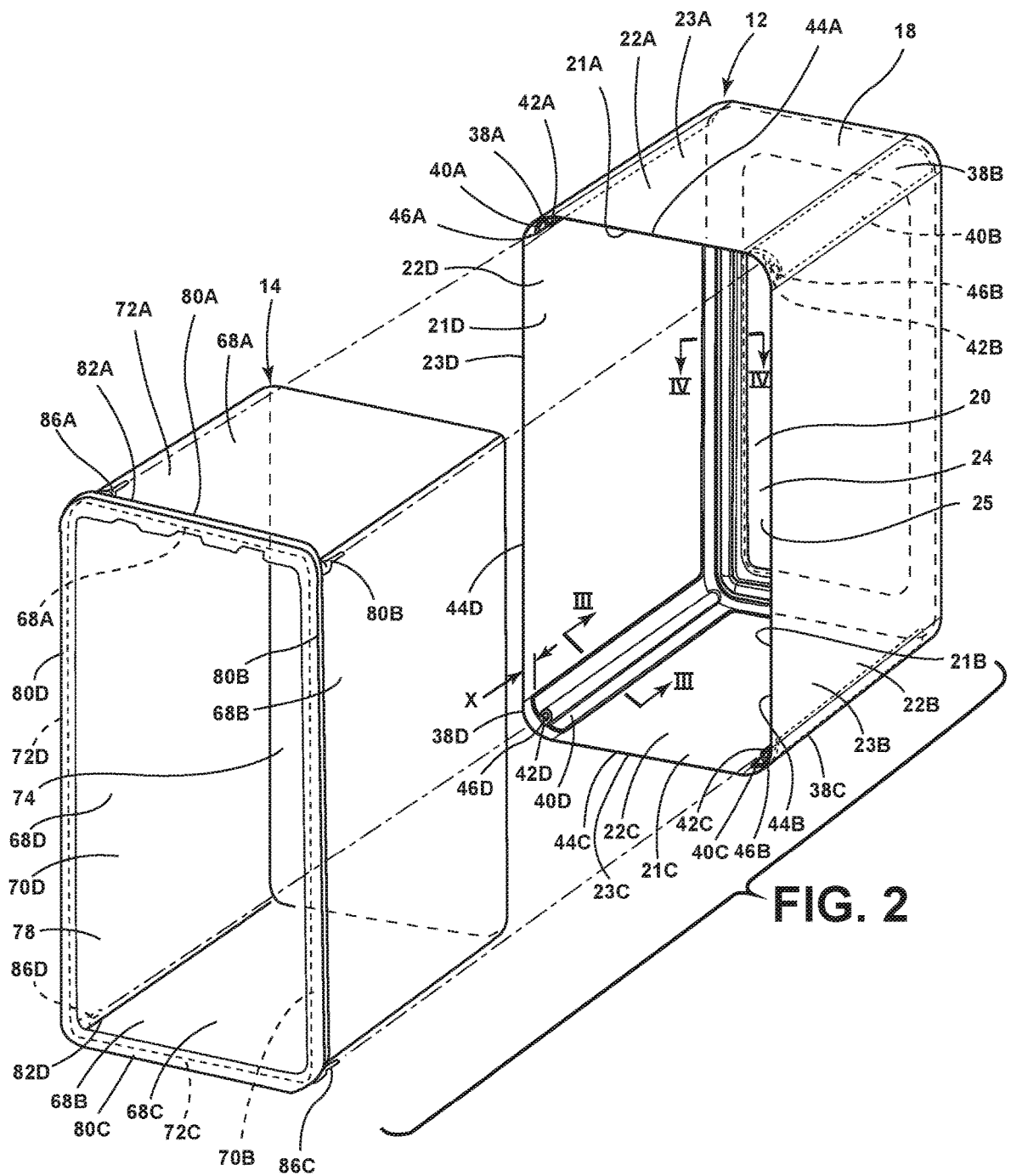
FIG. 2 is an exploded isometric view of a liner and wrapper assembly of the refrigerator of FIG. 1.

Refrigerator 1 includes a vacuum insulated cabinet structure 10 that includes a wrapper assembly 12 and a liner assembly 14 (see also FIG. 2). An outer covering 16 may optionally be positioned over the cabinet structure 10 to provide the desired exterior appearance. The outer covering 16 may comprise sheet metal or other suitable material.

Figure 4:
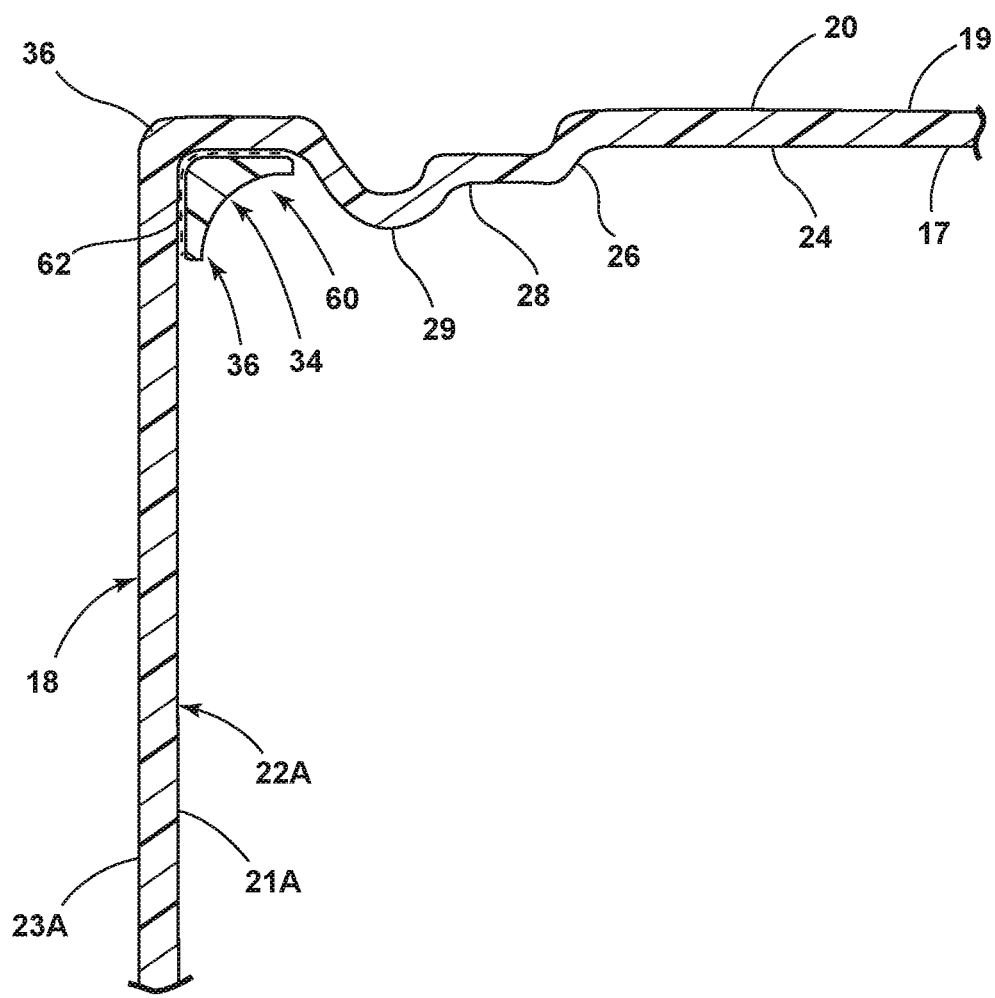
FIG. 4 is a cross-sectional view of a portion of the wrapper assembly of FIG. 2.

With reference to FIG. 2, wrapper assembly 12 includes a polymer wrapper member 18 that is thermoformed from a sheet of polymer material utilizing known thermoforming processes. The polymer wrapper member 18 includes a generally rectangular base wall 20 and four sidewalls 22A-22D that extend transversely from the base wall 20 to form corners 36. Base wall 20 includes an inner surface 17, and an outer surface 19 (FIG. 4). Sidewalls 22A-22D include inner surfaces 21A-21D, respectively, and outer surfaces 23A-23D, respectively. The base wall 20 has a generally planar central portion 24, and may optionally include one or more reinforcing features such as transverse portions 26 and raised portions 28 and 29 (see also FIG. 4) that extend around a perimeter 32 of base wall 20 to provide stiffening and/or to provide location features for an optional base stiffener member 34. As discussed in more detail below, the optional base stiffener member 34 is ring-shaped, and may be adhesively secured to corner 36 which is formed at the junction of base wall 20 and sidewalls 22A and 22D.

The wrapper member 18 may be thermoformed from suitable polymer materials such as ABS, HIPS, PVC, etc., utilizing known methods. Corners 38A-38D formed at the intersection of the sidewalls 22A-22D may have a relatively large radius. For example, the corners 38A-38D may have a radius of about 1.0 inch to about 6.0 inches or more. The enlarged radii at corners 38A-38D facilitates thermoforming of wrapper member 18, and eliminates a sharp outer corner that may be subject to damage. However, it will be understood that the corners 38A-38D may alternatively comprise sharp corners having a radius of 0.0 inches to 1.0 inch. During assembly, after thermoforming of the wrapper member 18, elongated corner stiffeners 40A-40D are adhesively secured to corners 38A-38D, respectively. Elongated corner stiffeners 40A-40D include openings 42A-42D, respectively, that face towards peripheral edges 44A-44D of sidewalls 22A-22D, respectively, of wrapper member 18. The outer ends 46A-46D of elongated corner stiffeners 40A-40D, respectively, are spaced inwardly from peripheral edges 44A-44D by a distance "X." As discussed in more detail below, this provides clearance for assembly with liner assembly 14.

Figure 3:
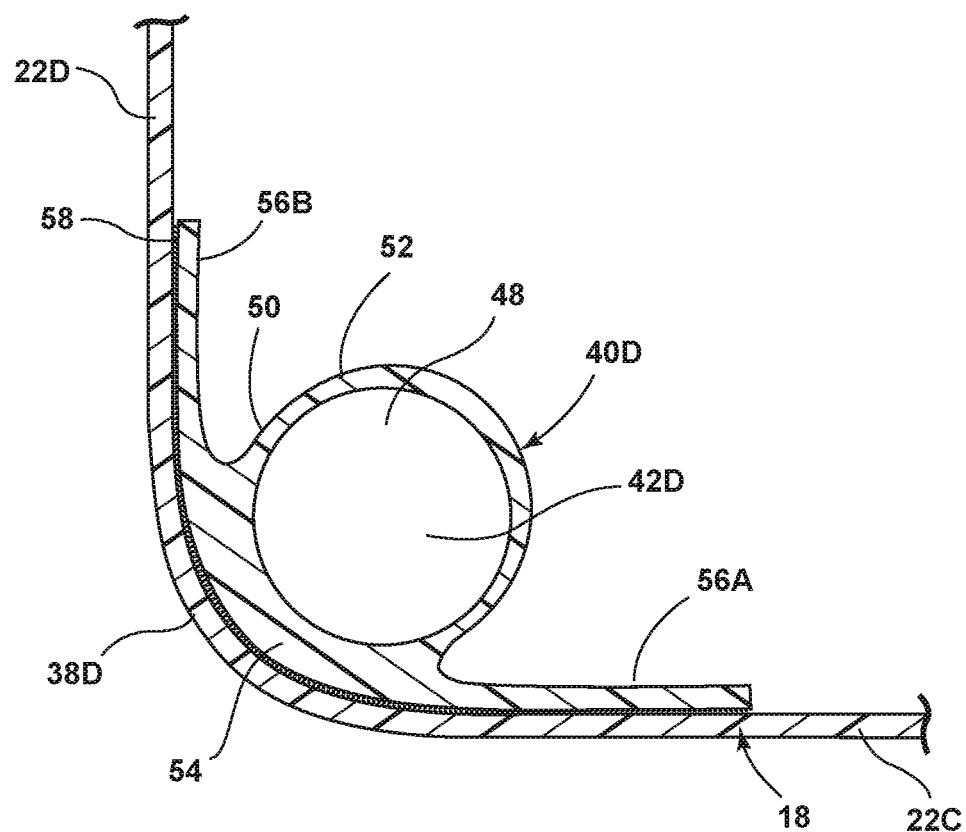
FIG. 3 is a cross-sectional view of a portion of the wrapper assembly of FIG. 2.

With reference to FIG. 3, the corner stiffeners 40A-40D include an elongated cylindrical cavity 48 that forms open ends 42A-42D. A cylindrical sidewall 50 includes a cylindrical outer surface portion 52, such that the sidewall 50 has a generally uniform thickness except in a region 54 adjacent corners 38A-38D. The elongated corner stiffeners 40A-40D also include flaps or wings 56A and 56B that extend outwardly from sidewall 50 along the sidewalls 22A-22D of wrapper member 18. Adhesive 58 is disposed between the corner stiffeners 40A-40D and wrapper member 18 to adhesively secure the corner stiffeners 40A-40D to the wrapper member 18. Adhesive 58 may comprise 3M™ DP125 epoxy adhesive, Henkel Loctite® E90-FL 1 epoxy adhesive, or other suitable known adhesive. The elongated corner stiffeners 40A-40D may be made from a polymer material such as ABS, HIPS, PVC, etc., or other suitable material. Although the corner stiffeners 40 preferably comprise a polymer material, corner stiffeners 40 may comprise extruded aluminum or the like.

With further reference to FIG. 4, an optional base stiffener member 34 may be adhesively secured to inside 60 of corner 36 of wrapper 18. If a base stiffener member 34 is to be installed, the base stiffener member 34 is preferably installed prior to installation of the corner stiffeners 40A-40D. Adhesive 62 may be utilized to secure the base stiffener member 34. Adhesive 62 may be identical to adhesive 58, or other suitable adhesive. The base stiffener member 34 may comprise a polymer material such as ABS, HIPS, PVC, etc., or other suitable polymer or metal material. The base stiffener member 34 is preferably a one piece ring-shaped member. However, base stiffener member 32 may also comprise a multi-piece member.

Figure 5:
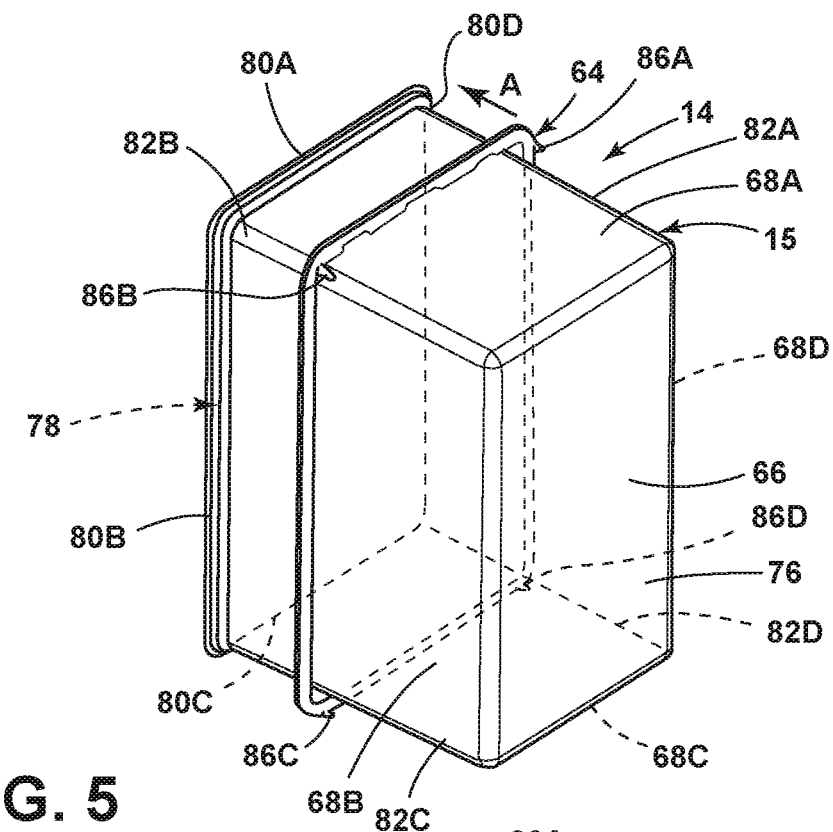
FIG. 5 is an isometric view of a liner and resilient ring during assembly.
Figure 6:
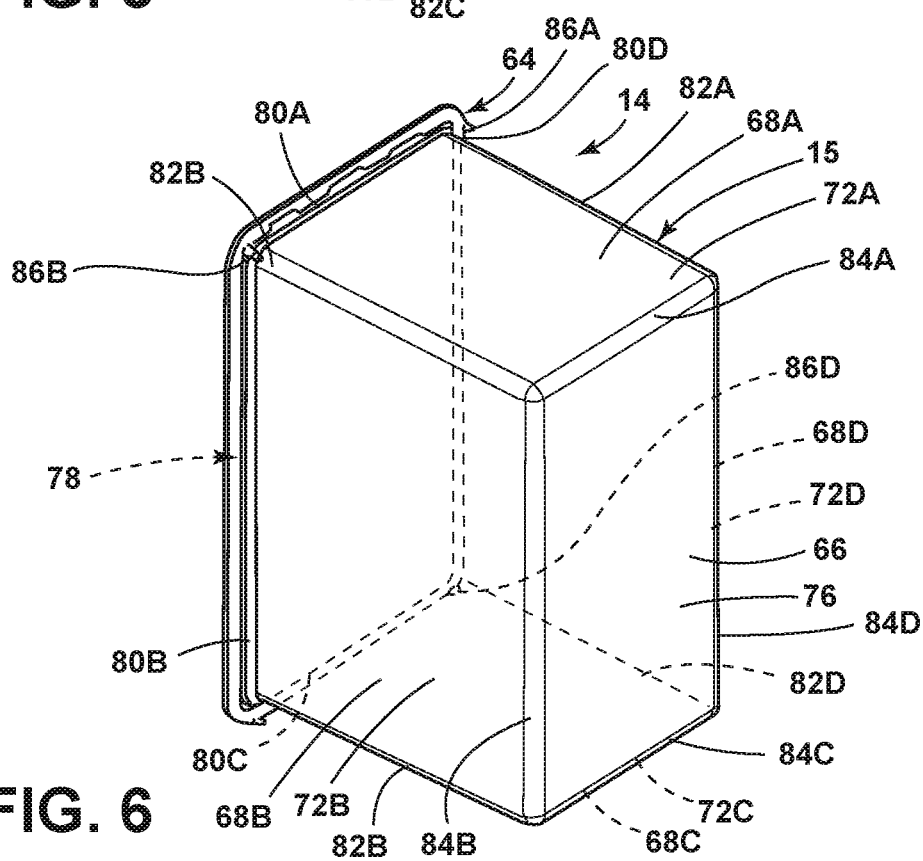
FIG. 6 is an isometric view of a liner and resilient ring during assembly.

With further reference to FIGS. 5 and 6, liner assembly 14 includes a liner member 15 and a resilient ring 64 that is installed to liner member 15 by sliding resilient ring 64 onto liner member 15 in the direction of the arrow "A" (FIG. 5). As discussed in more detail below, resilient ring 64 includes pins 86A-86D that are received in openings 42A-42D, respectively, of corner stiffeners 40A-40D, respectively, when liner assembly 14 is assembled with wrapper assembly 12. Liner member 15 is thermoformed from a sheet of polymer material utilizing known processes. Liner member 15 includes a base wall 66 and sidewalls 68A-68D that extend transversely from base wall 66 (see also FIG. 2). Sidewalls 68A-68D include inner surfaces 70A-70D, respectively, and outer surfaces 72A-72D, respectively. Sidewalls 68A-68D include edges 80A-80D that extend around opening 78 of liner member 15 to form peripheral edge 80. The intersections of sidewalls 68A-68D form corners 82A-82B, and the intersection of sidewalls 68A-68D with base wall 66 forms corners 84A-84D, respectively. The corners 82A-82D and 84A-84D may have relatively large radii such that a generally uniform gap is formed between the corners of liner member 15 and wrapper member 18.

Figure 7:
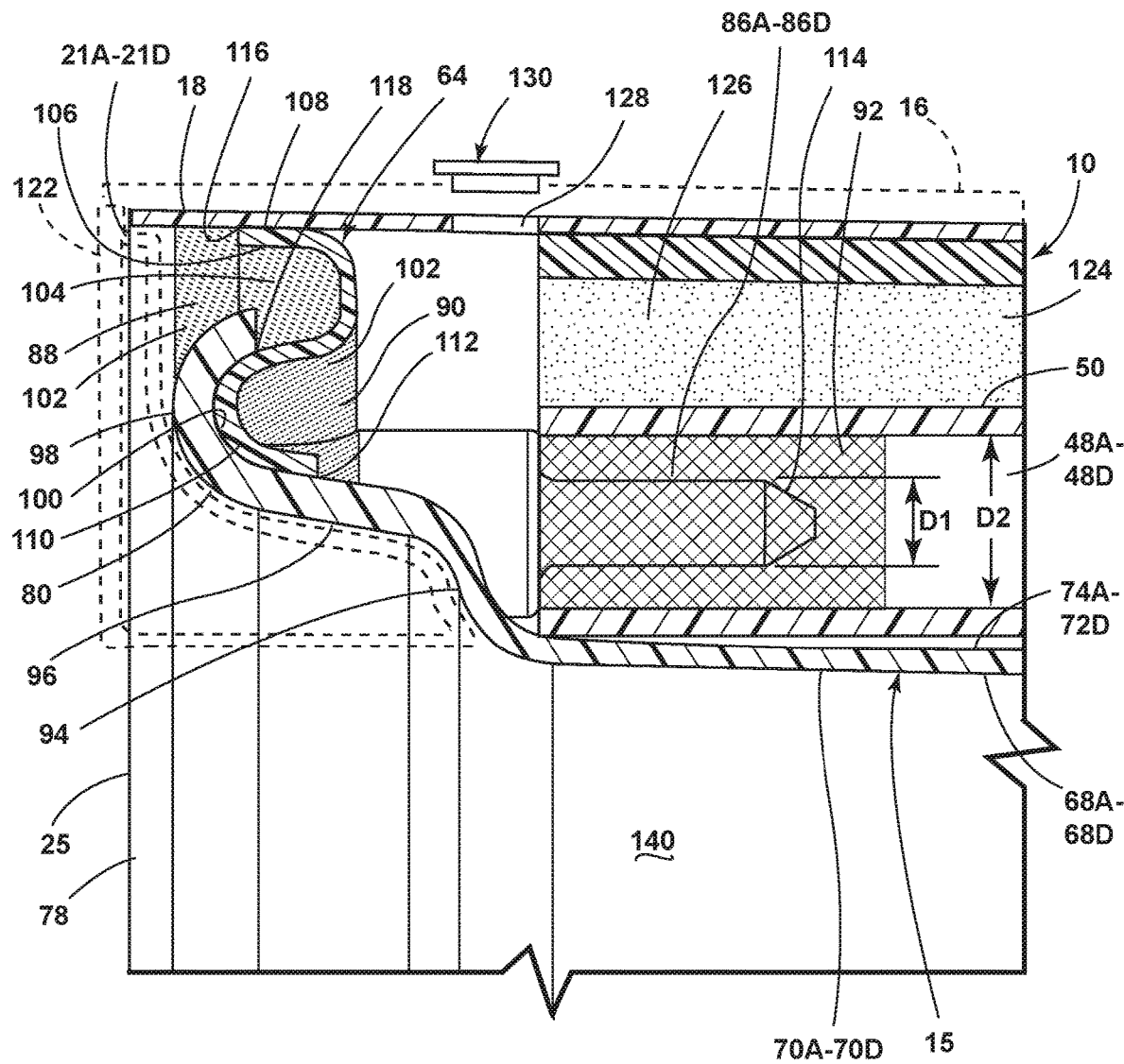
FIG. 7 is a cross-sectional view of a portion of the liner, wrapper, and resilient ring in an assembled condition.

With further reference to FIG. 7 peripheral edge 80 of liner member 15 includes a first transverse portion 94 that extends outwardly, and a second portion 96 that includes a curved end portion or lip 98 that forms a concave groove 100 that faces away from opening 78. Resilient ring 64 is generally S-shaped in cross section, and forms a first channel 102 that faces inwardly, and a second channel 104 that faces outwardly. Resilient ring 64 is preferably made of a flexible polymeric or elastomeric material. A flap or edge 106 of resilient ring 64 includes an outer surface 108 that seals against inner surfaces 21A-21D of wrapper member 18. The outer dimension defined by outer surface of flap 106 is preferably somewhat greater than the dimension across opening 25 of wrapper member 18 such that the resilient ring 64 forms an interference fit when assembled as shown in FIG. 7.

As discussed above, resilient ring 64 is initially installed on liner member 15 by sliding resilient ring 64 onto liner member 15 as shown in FIGS. 5 and 6. As the resilient ring 64 is moved to the fully installed position shown in FIGS. 6 and 7, a curved portion 110 of resilient ring 64 forming channel 102 contacts concave surface 100 of curved end portion 98 of edge 80 of liner member 15. Adhesive such as 3M™ DP125 or Loctite® E90-FL or other suitable adhesive is utilized to adhesively secure resilient ring 64 to liner member 15.

Prior to positioning liner assembly 14 in wrapper assembly 12, adhesive 90 may be positioned in first channel 102 to ensure that seam 112 is sealed at the line of contact between liner member 15 and resilient ring 64. Adhesive 92 may also be positioned in elongated cavities 48A-48D of corner stiffeners 40A-40D, respectively, adjacent the openings 42A-42D.

After the corner stiffeners 40 are adhesively secured to wrapper member 18 to form wrapper assembly 12, and after resilient ring 64 is adhesively secured to liner member 15 to form liner assembly 14, the liner assembly 14 is then positioned inside of wrapper assembly 12. As the liner assembly 14 is positioned in wrapper assembly 12, the pins 86A-86D are received in openings 42A-42D, and the pins 86A-86D become embedded in the adhesive 92. Pins 86A-86D may have a tapered end portion 114 to facilitate insertion of pins 86A-86D into openings 42A-42D during assembly. As shown in FIG. 7, pins 86A-86D may have an outer diameter D1 that is significantly smaller than an inner diameter D2 of cylindrical cavities 48A-48D. The large clearance facilitates assembly while maintaining a required degree of alignment between the components. After the liner assembly 14 is inserted into wrapper assembly 12, adhesive 88 may be deposited into second channel 104 to ensure that the seams 116 and 118 formed between resilient ring 64 and wrapper member 18 and liner member 15, respectively, are sealed. Adhesive 88 may fill channel 104 and also fill region 102 between curved end portion 98 of liner member 15 and wrapper member 18. Adhesives 88, 90, and 92 may be identical to adhesive 58, or other suitable adhesive. Alternatively, other suitable adhesive may be utilized. After the liner assembly 14 is installed in wrapper assembly 12, a trim member 122 may be adhesively secured to liner member 15 and/or wrapper member 18 to close off channel 104 and to provide a smooth exterior appearance. Also, a sheet metal outer skin may be positioned over the wrapper assembly 12 to provide a finished outer surface that includes sharp outer corners 11A-11D (FIG. 1).

After the adhesive 88, 90, and 92 cures, the cabinet structure 10 forms a rigid structure defining a cavity 124 between the wrapper assembly 12 and liner assembly 14. Sidewalls 22A-22D and base wall 20 of wrapper 12 may be spaced apart from sidewalls 68A-68D and base wall 66, respectively, of liner 14 such that cavity 124 extends around substantially the entire cabinet structure 10. The cavity 124 may be filled with porous filler material 126. The porous filler material 126 may comprise silica powder that is introduced through one or more openings 128 in liner member 15 and/or wrapper member 18. The cabinet structure 10 may then be subject to a vacuum to thereby evacuate cavity 124, and one or more caps 130 or other suitable devices may be utilized to close and seal openings 128 to ensure that cavity 124 maintains a vacuum. The vacuum may be formed by positioning the cabinet structure 10 in a vacuum chamber (not shown) prior to installing caps 130 over openings 128. The caps 130 may then be installed to seal openings 128 while the cabinet structure 10 is in the vacuum chamber, and the cabinet structure 10 is then be removed from the vacuum chamber.

Liner member 15 and/or wrapper member 18 may be thermoformed from a thermoplastic polymer sheet including outer layers that comprise a suitable thermoplastic polymer material such as High Impact Polystyrene (HIPS) or Acrylonitrile, Butadiene and Styrene (ABS). The sheet may include a barrier layer that comprises a thermoplastic polymer material that is impervious to one or more gasses such as nitrogen, oxygen, water vapor, carbon dioxide, etc. such that the liner member 15 and wrapper member 18 provide a barrier to permit forming a vacuum in cavity 124. The barrier layer preferably comprises a material that blocks both oxygen and water vapor simultaneously. Examples of such material include Polyvinylidene Chloride (PVdC), nylon, or liquid crystal polymer.

Alternatively, the inner and/or outer surfaces of liner member 15 and/or wrapper member 18 may be coated after thermoforming utilizing plasma polymerization or Physical Vapor Deposition (PVD) processes. The coatings applied by these processes block oxygen, nitrogen, water vapor, and other gasses. The coating may comprise an organic or inorganic material such as silicon oxide that is deposited utilizing a plasma polymerization process. The coating may comprise a metallic layer such as aluminum, stainless steel, chrome, or other suitable metal that is applied utilizing a Plasma Vapor Deposition (PVD) process. The coating provides a barrier that blocks gasses to maintain the vacuum formed in cavity 124. An additional outer layer (not shown) in the form of a polymer protective cap may optionally be applied over the barrier coating. Resilient ring 64 may also include a barrier layer and/or a barrier coating.

Referring again to FIG. 1, the liner member 15 and wrapper member 18 may optionally include a stepped lower rear portion 132 that includes an upright wall portion 134 and a horizontal wall portion 136. The stepped portion 132 provides a space 138 that is outside of the cavity 140 of cabinet structure 10 to permit mounting of refrigerator system components 8.

It is also to be understood that variations and modifications can be made on the aforementioned structures and methods without departing from the concepts of the present device, and further it is to be understood that such concepts are intended to be covered by the following claims unless these claims by their language expressly state otherwise.

What is claimed is:

1. A method of making a vacuum insulated refrigerator cabinet structure, the method comprising:
   thermoforming a first thermoplastic polymer sheet to form a wrapper having a base wall and four sidewalls having inner and outer sides and extending transversely from the base wall to form four elongated inside corners and a main opening;
   thermoforming a second thermoplastic polymer sheet to form a liner having a base wall and four sidewalls having inner and outer sides and extending transversely from the base wall, wherein each sidewall includes a free edge opposite the base wall forming a main opening;
   adhesively securing an elongated corner stiffener to each elongated inside corner of the wrapper, wherein each elongated corner stiffener includes an opening;
   securing a resilient ring to the liner adjacent to the free edges of the sidewalls, the resilient ring including four corners and wherein each corner includes a pin projecting from the corner;
   positioning the liner inside the wrapper to form a cavity between the wrapper and the liner, wherein the pins of the resilient ring are received in the openings of the elongated corner stiffeners, and wherein the resilient ring extends between the inner sides of the wrapper sidewalls and the outer sidewalls of the liner to seal the cavity;
   adhesively sealing the resilient ring to the wrapper and to the liner;
   causing porous material to be disposed in the cavity between the wrapper and the liner;
   forming a vacuum in the cavity; and
   sealing the cavity to maintain the vacuum.

2. The method of claim 1, wherein:
   thermoforming the wrapper includes forming the base wall of the wrapper into a rectangular shape, and forming the four sidewalls of the wrapper into a generally flat shape.

3. The method of claim 1 including:
   utilizing polymer sheets including at least one barrier layer comprising polymer that is substantially impervious to at least one of gaseous oxygen, gaseous nitrogen, gaseous carbon dioxide, water vapor and gaseous carbon monoxide to form at least one of the wrapper and the liner.

4. The method of claim 1, including:
   filling at least a portion of each of the openings of the elongated corner stiffeners with adhesive such that the pins are disposed in the adhesive.

5. The method of claim 1, wherein:
   the resilient ring includes an outer surface having a dimension that is greater than a dimension between opposite inner sides of the wrapper adjacent the main opening of the wrapper and forms an interference fit between the resilient ring and the wrapper such that the resilient ring is deformed when the liner is positioned inside the wrapper.

6. The method of claim 1, wherein:
   the sidewalls of the liner include edge flanges adjacent the free edges that extend transversely outward; and including:
   causing the resilient ring to contact the edge flanges.

7. The method of claim 6, including:
   adhesively bonding the resilient ring to the edge flanges.

8. The method of claim 7, wherein:
   thermoforming the liner includes forming the edge flanges to form an elongated ring-shaped inner liner channel extending around the liner, wherein the elongated ring-shaped inner liner channel faces the cavity between the wrapper and the liner;
   the resilient ring includes a raised ridge that is received in the elongated ring-shaped inner liner channel.

9. The method of claim 8, wherein:
   the resilient ring is S-shaped in cross section to form inner and outer ring-shaped channels that face in opposite directions;
   a portion of the resilient ring is disposed in the elongated ring-shaped inner liner channel;

an edge portion of the resilient ring adjacent the outer ring-shaped channel forms a flexible flap that engages the inner surfaces of the sidewalls of the wrapper.

10. The method of claim 9, including:
filling at least a portion of the outer ring-shaped channel with adhesive material.

11. The method of claim 1, wherein:
the cavity between the wrapper and the liner is filled with porous powder after the liner is positioned inside the wrapper.

12. A vacuum insulated refrigerator cabinet structure, comprising:
a wrapper having a base wall and four sidewalls having inner and outer sides and extending transversely from the base wall to form four elongated inside corners and a first peripheral edge extending around a first main opening;
a liner disposed inside the wrapper to define a vacuum cavity between the wrapper and the liner, the liner having a base wall and four sidewalls having inner and outer sides and extending transversely from the base wall, wherein each sidewall includes a free edge opposite the base wall forming a second peripheral edge extending around a second main opening, wherein the first and second peripheral edges are spaced apart to form a gap;
porous material disposed in the vacuum cavity between the wrapper and the liner;
elongated corner stiffeners disposed at each elongated inside corner of the wrapper, wherein each elongated corner stiffener includes an opening having adhesive disposed therein;
a resilient ring extending across the gap, the resilient ring including four corners, wherein each corner includes a pin projecting from the corner into the openings of the elongated corner stiffeners and into the adhesive disposed in the openings, and wherein the resilient ring is adhesively secured to the wrapper and to the liner.

13. The vacuum insulated refrigerator cabinet structure of claim 12, wherein:
the base wall of the wrapper has a rectangular shape, and the four sidewalls of the wrapper have a substantially flat shape.

14. The vacuum insulated refrigerator cabinet structure of claim 12, wherein:
the wrapper and the liner are thermoformed from polymer sheets including at least one barrier layer that is substantially impervious to at least one of gaseous oxygen, gaseous nitrogen, gaseous carbon dioxide, water vapor and gaseous carbon monoxide.

15. The vacuum insulated refrigerator cabinet structure of claim 12, wherein:
the resilient ring includes an outer surface having a dimension that is greater than a dimension between opposite inner sides of the wrapper adjacent the main opening of the wrapper prior to assembly of the wrapper and the liner such that an interference fit is formed between the resilient ring and the wrapper.

16. The vacuum insulated refrigerator cabinet structure of claim 12, wherein:
the sidewalls of the liner include edge flanges adjacent the free edges that extend transversely outward, and wherein the resilient ring contacts the edge flanges.

17. The vacuum insulated refrigerator cabinet structure of claim 16, wherein:
the resilient ring is adhesively bonded to the edge flanges.

18. The vacuum insulated refrigerator cabinet structure of claim 17, wherein:
the edge flanges of the liner include an elongated ring-shaped inner channel extending around the liner, wherein the inner channel faces the cavity between the wrapper and the liner; and
the resilient ring includes a raised ridge that is disposed in the elongated inner channel of the edge flanges of the liner.

19. The vacuum insulated refrigerator cabinet structure of claim 18, wherein:
the resilient ring is S-shaped in cross section and defines inner and outer ring-shaped channels that face in opposite directions;
a portion of the resilient ring is disposed in the elongated inner channel of the edge flanges of the liner;
an edge portion of the resilient ring adjacent the outer channel of the resilient ring composes a flexible flap that engages the inner surfaces of the sidewalls of the wrapper.

20. The vacuum insulated refrigerator cabinet structure of claim 19, wherein:
at least a portion of the outer ring-shaped channel of the resilient ring is filled with adhesive material.

* * * * *